United States Patent [19]
Tsuruta et al.

[11] Patent Number: 5,526,516
[45] Date of Patent: Jun. 11, 1996

[54] KNOWLEDGE DATA ASSIMILATION METHOD AND SYSTEM

[75] Inventors: Setsuo Tsuruta, Machida; Toshihiro Eguchi, Kawasaki; Kuniaki Matsumoto, Koutou-ku; Toshiya Ooshima, Katsuta, all of Japan

[73] Assignee: Hitachi, Ltd., Tokyo, Japan

[21] Appl. No.: 749,669

[22] Filed: Aug. 26, 1991

[30] Foreign Application Priority Data

Aug. 29, 1990 [JP] Japan .................................. 2-225044

[51] Int. Cl.$^6$ .................................................. G06F 17/30
[52] U.S. Cl. .................................. 395/600; 364/DIG. 1; 364/282.1
[58] Field of Search ......................... 395/12, 600, 10, 395/20, 23, 54

[56] References Cited

U.S. PATENT DOCUMENTS 4,926,343   5/1990   Tsuruta et al. ........................ 395/12

FOREIGN PATENT DOCUMENTS 0193207   9/1986   European Pat. Off. .
2182572   7/1990   Japan .

OTHER PUBLICATIONS

Tsuruta, Setsuo, et al. "A Knowledge-Based Interactive Train Scheduling System Aiming at Large-Scale Complex Planning Expert Systems," Proceedings of the International Workshop on Artificial Intelligence for Industrial Applications, 1988, pp. 490–495. (English).

Primary Examiner—Thomas M. Heckler
Attorney, Agent, or Firm—Fay, Sharpe, Beall, Fagan, Minnich & McKee

[57] ABSTRACT

The present invention enables change, inactivation and deletion of the value and content of the knowledge data stored for problem solution, by creating the assimilation proposal to assimilate the said knowledge based on the knowledge data stored in advance to solve object problems, by evaluating the created assimilation plan according to the evaluation standards stored in advance, by determining the adequate assimilation plan based on the evaluation result, and by changing the knowledge data stored in advance according to the adequate assimilation plan; thereby improving the solution precision and ensuring satisfactory assimilation precision within reasonably short time.

20 Claims, 4 Drawing Sheets

KNOWLEDGE DATA ASSIMILATION METHOD AND SYSTEM

BACKGROUND OF INVENTION

1. Field of the Invention

The present invention relates to an assimilation method and system for knowledge data to solve prediction problems, planning problems, replanning problems, and especially to an assimilation method and system of knowledge data regarding a train traffic regulation system for replanning against train disorders, train traffic predictions, transportation schedule generations travelling plan generation for maintenance and service personnel and man allocation system etc.

2. Description of the Prior Art

The conventional system has a knowledge extraction support function without a function to incorporate, realize and verify the extracted knowledge, as discussed in the knowledge extraction support system RUSSY (Proceedings on Railway Cybernetics, 1984; pages 139-143) for train traffic regulation.

The cited technique has no function to assimilate the extracted knowledge for adaptation, and has a problem in that problem solving system storing with the knowledge has produced unsatisfactory solutions of low precision.

SUMMARY OF THE INVENTION

The object of the present invention is to provide precision satisfactory solutions having high precision with better adaptability of the system to change, inactivation and/or deletion of the values and contents of the knowledge data stored in a storage in the system for problem solution.

Another object of the present invention is to ensure that the assimilation for satisfactory adaptation occurs within a reasonably short period of time.

To achieve these objects, the present invention provides a problem solving knowledge data assimilation method and system using an information processing device comprising a processor, a storage device and an input/output device, comprising functions such as ① generation of the assimilation plan for the assimilation of in the storage based on knowledge data stored in advance for solution of the problem, ② evaluation of the generated assimilation plan in conformity with the evaluation knowledge stored in advance, ③ determination of the satisfactory assimilation plan based on the result of the evaluation, and ④ change of the knowledge data stored in advance according to the adequate assimilation plan.

More specifically, the present invention provides functions to output a satisfactory assimilation plan ① by supplying the storage device with the knowledge and data for assimilation, ② by generating the assimilation plan by use of such knowledge and data, ③ by evaluating the generated assimilation plan, and ④ by repeating these procedures ①-③; until a satisfactory plan is obtained or by taking similar means.

The objects can also be attained by the invention providing a man-machine interactive function which permits user's set-up and change of the assimilation condition plan. For automatic change of the assimilation condition plan and for automatic generation of its guidance, the invention provides that the storage device stores the knowledge, and proposes an alternative plan of assimilation condition and the data on normally reasonable changeable range etc. The invention also allows repeating, as many times as required, the man-machine interactive modification (alteration) of the assimilation plan and its evaluation.

The present invention has the following functions and behaviors:

Coping with the current status such as prediction error information, for example, an assimilation plan inference function which generates the assimilation plan, generates the assimilation candidate list by using the knowledge and data stored in the storage device for analyzing the error information, and for inferring assimilation items or assimilation values. Then, out of these assimilation candidates, the one whose assimilation items and values meet the specified assimilation conditions and are consistant with each other is selected and edited as an assimilation plan, thus ensuring generation of the satisfactory assimilation plan.

The alternative (or modified) plan of assimilation condition is generated by integrated use of data like the knowledge for proposing the alternative plan of assimilation condition, data like the permissible change range and data like the degree of alteration request of the alternative candidate of assimilation condition, thereby ensuring the alternative plan to be reasonable.

The foregoing and other objects, advantages, manner of operation and novel features of the present invention will be understood from the following detailed description when read in connection with the accompanying drawings.

DETAILED DESCRIPTION OF THE PREFERRED EMBODIMENT

The first embodiment of this invention will be described with reference to FIG. 1.

Figure 1:
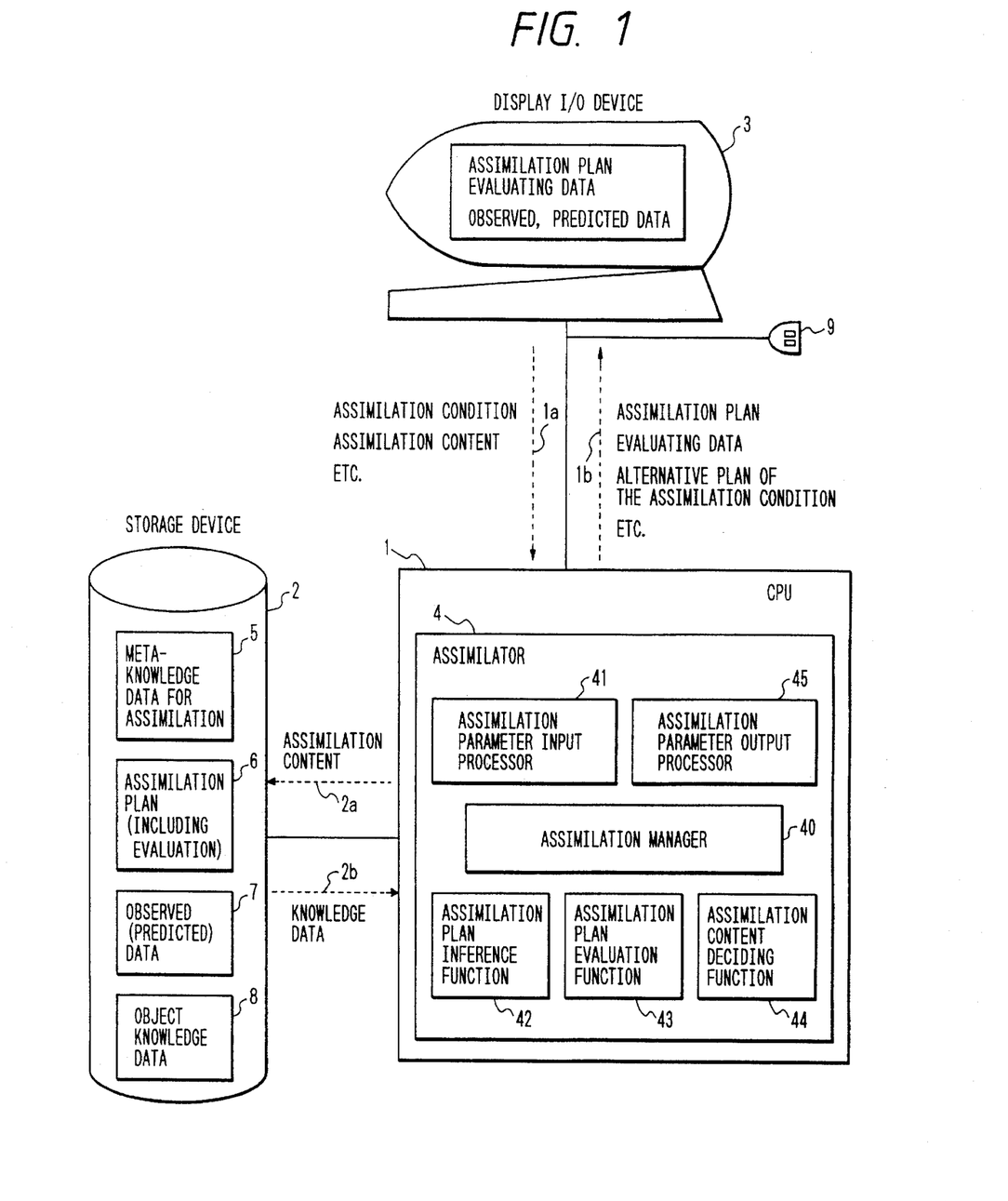
FIG. 1 is an overall block diagram representing an embodiment of this invention.

FIG. 1 is an overall block diagram.

The system as an embodiment of this invention comprises;

CPU 1 including assimilation processor 4 which is used to assimilate the knowledge and data for solving the object problems (for example, the train traffic prediction problem, or the problem to recover from a train disorder);

storage device 2 which includes assimilation proposal 6, meta-knowledge data for assimilation 5 for its generation and evaluation, object knowledge data 8, observed data 7 (and predicted data, depending on particular cases); and display input device 3 which displays and inputs the data regarding assimilation conditions and assimilation contents.

These will be described with reference to concrete examples: the above assimilation proposal 6 is something as "the up-train speed is slightly increased during the overcrowded rush hour time from 7:30 to 8:00 at a particular station." The observed (predicted) data 7 includes delayed time and stoppage time, and object knowledge 8 includes knowledge on leaving velocity and loading velocity (relationship to congestion rate) and such knowledge as "the leaving velocity is high at the terminal station at the same leaving velocity even when the train is crowded."

The meta-knowledge data for assimilation 5 is based on the following rules, for example:

If the delayed time for stoppage at the station is generally overestimated,
and the overall assimilation of the number of the loading and leaving passengers is sufficient,
then the overall assimilation plan for the velocity of the carriages loaded and left is great. If the delayed time for stoppage at the passengers maldistribution station is extremely under-estimated
and the time zone for evaluating the delay at such a station corresponds to morning rush hour,
then the assimilation plan for passenger maldistribution rate at the passenger maldistribution station which is poorly evaluated for the delay is considerably great.

The assimilation conditions for this case will include the time zone of 7:30 to 9:00 or morning rush hour at the object station, the direction for up/down-train, destination of the train, permissible assimilation range within 10 percent, etc.

The assimilation processor 4 comprises;

assimilation parameter input processor 41 which serves to enter the assimilation contents including assimilation range and assimilation contents;

assimilation output processor 45 which serves to display and output the assimilation plan, its evaluation data and alternative plan of assimilation condition;

assimilation plan evaluation function 43;

assimilation plan inference function 42 which gives the assimilation plan (alternative plan) and assimilation condition change plan according to the evaluation result;

assimilation content deciding function 44 which sets up the assimilation content at the time specified by the operator (human operator, user, etc.); and assimilation manager 40 which controls the sequence of executing the above functions 41 to 45 as well as the data transfer.

The assimilation conditions and assimilation contents set by the operator are transmitted from display input device 3 to assimilation processor 4 of CPU 1. An assimilation proposal is given in conformity to the assignment condition, and is transferred to the display/input device (1b), together with the evaluation data (and an alternative plan of the assimilation condition in some cases), where it is displayed. The assimilation content set by the operator and transferred to CPU 1 via display/input device 3 is further sent to storage device 2 (2a), wherein the knowledge and data are changed or added according to the assimilation content. The knowledge and data in storage device 2 are sent to CPU1 (2b) to be used to solve the object problem or assignment processing. To input information into assimilation processor 1, mouse 9 can be used for the input device.

This will permit entering the data of the time zone, station, train, etc. directly onto the graphic form by picking up the column representing time band, the line representing the station or "suji" which is a sort of line representing the train running trajectory. In this way, it is possible to initialize and change the assignment condition by the system.

Figure 2:
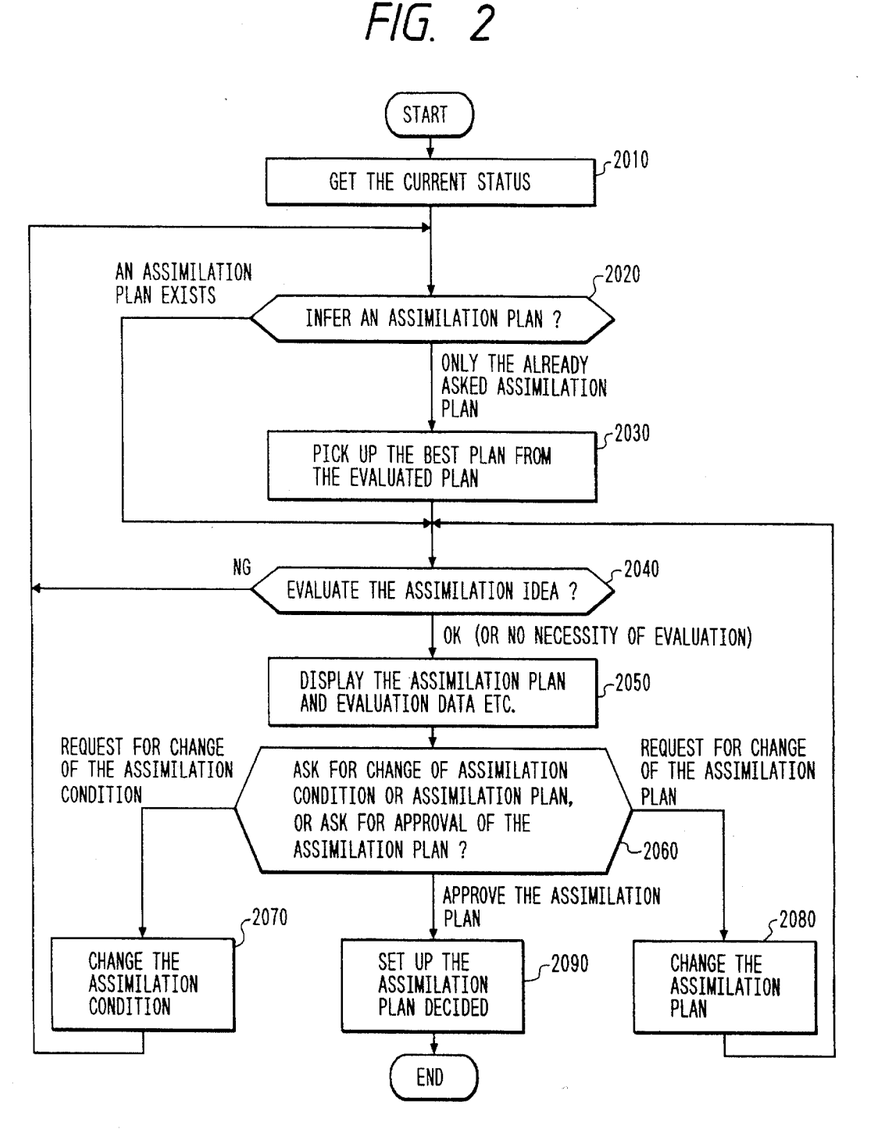
FIG. 2 is a flowchart representing the procedures in the assimilation processor.

FIG. 2 represents the main processing flow for assignment. Firstly, current statuses required for assimilation processing are set in block 2010; these current statuses include the discrepancy of the prediction (for example, delay of leaving time, loading time and stoppage time), errors for each item, and error status (overall deviation or partial deviation).

Next, the assimilation plan is inferred as will be described in detail with reference to block 2020 and FIG. 3. The proposal is directly processed in Block 2040 if there is any assimilation plan that satisfies the assimilation plan condition or alternative plan of the assimilation condition (described below) as a result. If there is no such assimilation plan, the plan evaluated as the best out of the assimilation plans already evaluated is picked up as the assimilation proposal, and is processed in block 2040 as requiring no evaluation. It is then processed in block 2050.

The unevaluated assimilation plan is subjected to the assimilation plan evaluation processing in block 2040. If the result of evaluation is negative (NG), it will be returned to the block 2020, and another alternative will be inferred. If the result is positive (OK) or "evaluation not required", block 2050 will display the assimilation plan, its evaluation data and alternative plan of the assimilation condition. Next, change of the assimilation condition, assimilation plan and approval for assimilation plan are input in block 2060. If the request for change of the assimilation condition is input, the assimilation condition will be changed in block 2070, and is sent back to block 2020. If the request for change of the assimilation plan is input, the assimilation plan will be changed in block 2080, and will be sent back to block 2040. If the approval for assimilation plan is input, the assimilation plan will be set (block 2090), thereby terminating the assimilation processing. The assimilation plan, request for change of the assimilation condition and their evaluation data can be integrated into a set and displayed as one screen on the multi-window screen, according to the specification, as required.

Figure 4:
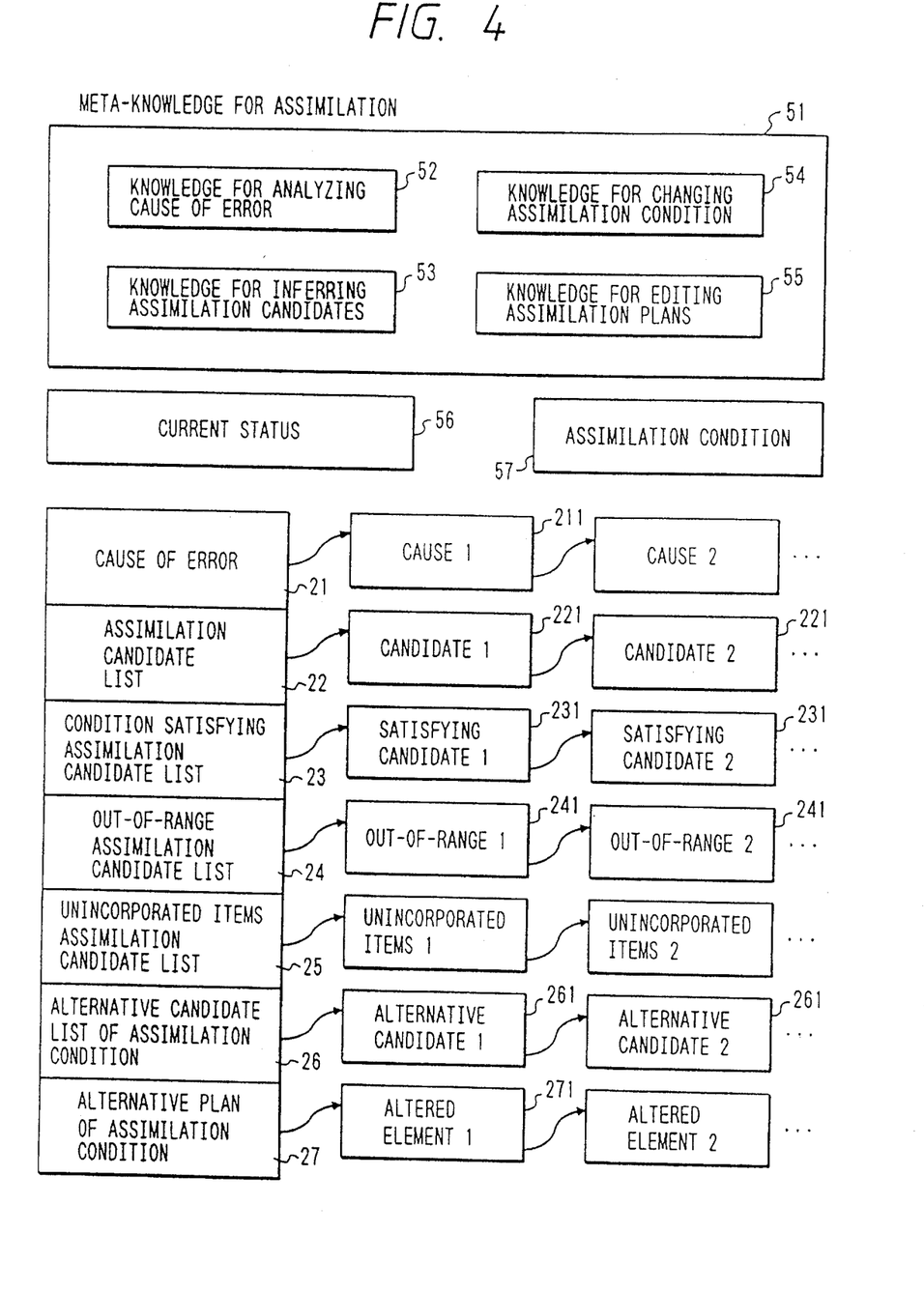
FIG. 4 is a block diagram representing the assimilation data.

FIG. 4 is a block diagram representing the meta-knowledge and data for assimilation.

Firstly, the meta-knowledge for assimilation 51 is used to infer the assimilation plan 6 and edit it, and to infer the adequate changed plan under assimilation condition 57. It comprises knowledge for analyzing cause of error 52, knowledge for inferring assimilation candidates 53, knowledge for changing assimilation condition 54 and knowledge for editing assimilation plan 55.

The data for assimilation includes current status 56, assimilation condition 57, cause for error (list) 21 (its element: 211), assimilation candidate list 22 (its element: assimilation candidate 221), condition satisfying assimilation candidate list 23 (its element: 231), out-of-range assimilation candidate list 24 (its element: 241) where the assimilation value is outside the range, out-of-items assimilation candidate list 25 (its element: 251) which is the assimilation candidate for the items outside the assimilation condition, alternative candidate list of assimilation condition 26 (its element: 261) and alternative plan of assimilation condition 27 (its element: 271). To give a specific example, if the above assimilation items correspond to the number of passengers at the main stations on the Yamanote Line in Tokyo (Tokyo, Shinagawa, Shibuya, Shinjuku and Ikebukuro), the data outside (unincorporated) the above items correspond to the number of passengers at other stations on the Yamanote Line.

The alternative candidate of assimilation condition 261 contains the items such as assimilation items name of requests for charge, number of requests for change, their change values, number of requests for upper limit change, lower limit change values, number of requests for lower limit change, etc.

Figure 3:
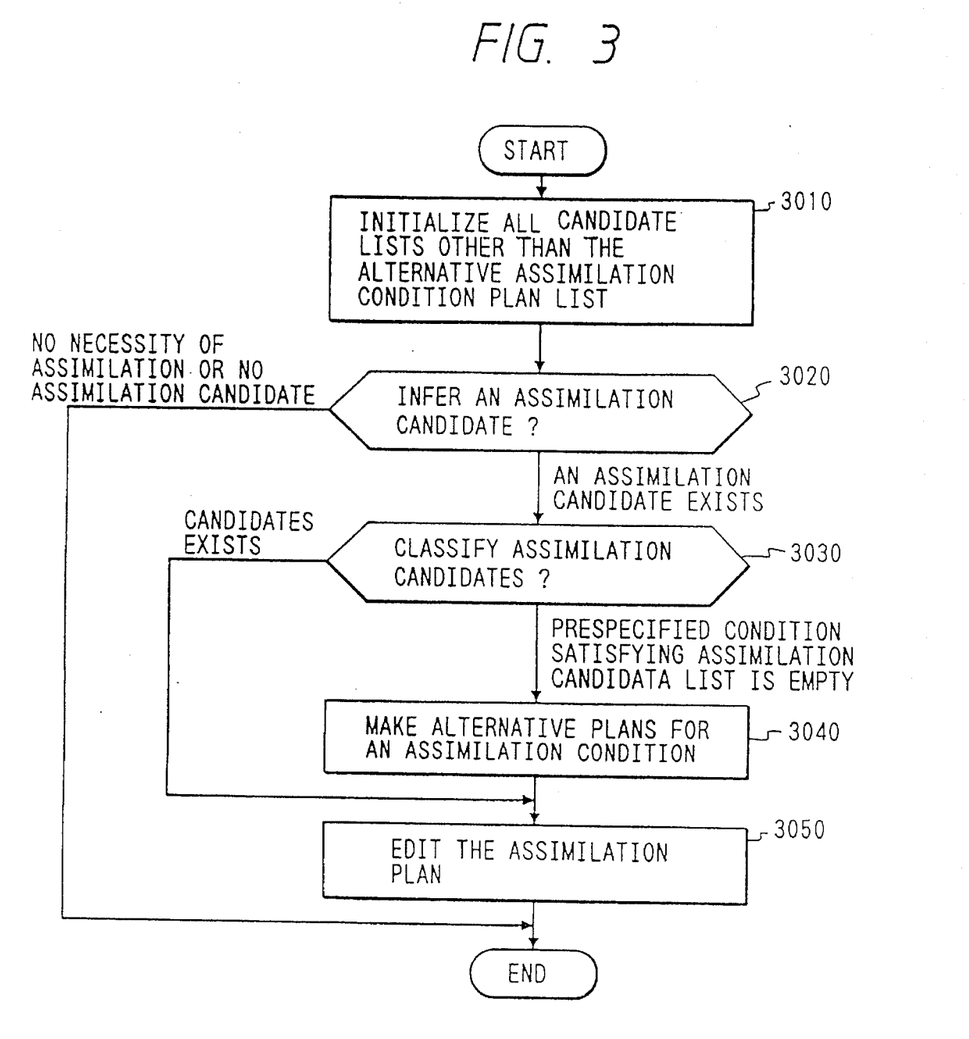
FIG. 3 is a flowchart representing the detailed procedures in the assimilation proposal inference block.

FIG. 3 is a flowchart of the assimilation plan inference (Block 2020 in FIG. 2) of assimilation plan inference function 42 in FIG. 1.

Firstly, block 3010 initializes all the candidate lists, excepting the alternative candidate list of assimilation condition 26.

Next, block 3020 infers assimilation candidate 221. That is, cause for error 21 is inferred by the production rule, etc. from current status 56 and knowledge for analyzing cause of error 52. Furthermore, assimilation candidate 221 is likewise inferred from cause for error 21 and knowledge for inferring assimilation candidates 53. If assimilation candidate list 22 is empty, processing is terminated; if not, block 3030 classifies the assimilation candidates. That is, assimilation candidates satisfying assimilation condition 57 are put into condition satisfying assimilation candidate list 23, those not included in the assimilation items are put into unincorporated items assimilation candidate list 25, and those where assimilation values are outside the values specified by assimilation condition 57 are put into out-of-range assimilation candidate list 24. If condition satisfying assimilation candidate list 23 is not empty, assimilation plan edit processing is performed in block 3050 directly; if empty, the said processing is performed after processing in block 3040.

Block 3040 generates the proposal for change of the assimilation condition. That is, assimilation candidates given in unincorporated items assimilation candidate list 25 and out-of-range assimilation candidate list 24 are transformed according to knowledge for changing assimilation condition 54, and the results are added to alternative candidate list of assimilation condition 26. For example, if the assimilation item names in alternative candidate list of assimilation condition 26 are the same as said assimilation candidates, the system counts up the number of requests for change in the corresponding alternative candidate 261. When the assimilation plan and alternative plan of assimilation condition should be changed or canceled, the items which are frequently subjected to request for change or cancellation are excluded from the assimilation item list, or are assigned with lower priority in the list, for example.

Furthermore, out-of-range assimilation candidate 241 given in out-of-range assimilation candidate list 24 is counted up by the upper limit number of requests for change (in case of the assimilation candidate exceeding the maximum value of assimilation condition), or the lower limit number or requests for change (in the case of the assimilation candidate below the minimum value of assimilation condition).

Reduce the number of candidates from the alternative candidate list of assimilation condition 26, according to knowledge for changing assimilation condition 54 and create alternative idea of assimilation condition 27.

In addition to the above, as examples of the knowledge for changing assimilation condition 54, the following cases are possible; if the number of requests for change is greater the specified value, the system accepts such requests for change, or if the (the number of requests for change+number of request for upper limit change×upper limit change value+ number of requests for lower limit change×lower limit change value) is greater than the specified value, the system accept such requests.

Block 3050 edits the assimilation candidates to give the assimilation plan. That is, if condition satisfying assimilation candidate list 23 is not empty, assimilation candidate 231 is picked up to be the assimilation plan. However, if there are two assimilation candidates having the same same items among the assimilation plans 6, and if their assimilation contents contradict with each other, then one of the two will be selected according to knowledge for editing assimilation plan 55. As examples of knowledge for editing assimilation plan 55, the following cases are possible; if one of the assimilation candidates request assimilation in the direction of increase whereas the other requests it in the direction of decrease, then the assimilation value of said item will be the average, maximum value, minimum value or simple average value (or average value including both directions for increase and decrease) of the assimilation values of the assimilation candidates in which the number of the assimilation candidates having the same item and same direction are greater in the condition satisfying assimilation candidate list 23.

If condition satisfying assimilation candidate list 23 is empty, the assimilation candidates satisfying the assimilation condition for alternative plan of assimilation condition 27 are picked up from the unincorporated items assimilation candidate list 25 and out-of-range assimilation candidate list 24, and are entered into condition satisfying assimilation candidate list 23, to be subjected to the said edit processing.

The present invention provides an automatic proposal of the assimilation plan of the knowledge and data for the problem solving system according to the specified conditions, so it is possible to ensure quick and accurate assimilation of the complicated knowledge and data of the problem solving system, including train traffic prediction and replanning against train disorder. This advantage of the present invention permits easy creation of providing high-precision, highly reliable train traffic prediction system and replanning system against train disorder.

What is claimed is:

1. A knowledge data assimilation method for changing data representing knowledge (problem solving knowledge data) for solving a problem by an information processing apparatus having a processor, a storage device for storing said problem solving knowledge data and data representing knowledge (assimilation knowledge data) for inferring assimilation candidates wherein said assimilation knowledge data can be taken as a kind of said problem solving knowledge data since said assimilation knowledge data is also able to be assimilated like said problem solving knowledge data, and an input/output device including a displaying device, comprising the following steps:

a. creating an assimilation candidate to assimilate said problem solving knowledge data by said processor utilizing said assimilation knowledge data, for inputting an assimilation proposal interactively through said input/output device;

b. evaluating the created assimilation candidate by said processor utilizing at least an evaluation standard stored in advance;

c. determining a satisfying assimilation proposal through interaction between said processor displaying a result of said evaluating and input data inputted for accepting said assimilation candidate as a satisfying assimilation proposal, and inputted for changing/modifying at least one of said assimilation candidate and assimilation knowledge data including assimilation conditions, from said input/output device;

d. changing said problem solving knowledge data by said processor according to said satisfying assimilation proposal when a satisfying assimilation proposal is determined (obtained); and e. repeating said steps a. through d. until a satisfying assimilation proposal is obtained.

2. The assimilation method according to claim 1, wherein the changing at least one of an assimilation candidate and an assimilation condition of the determining step in claim 1, includes:

f. a step of memorizing changed (corrected) items, their old values, their ranges, their newly inputted values and related items including the said assimilation knowledge data for automatic correction, by said processor checking said changed items and said related items in case of the change (correction); and g. a step of performing automatic correction by the processor using said assimilation knowledge data including said correction patterns when said items and their values are within the range or the same as those memorized in said assimilation knowledge data including said correction patterns.

3. The assimilation method according to claim 2, wherein said step of performing said automatic correction further comprises a step of outputting a corrected result and a step of undoing the corrected correction by said processor if an undoing of the correction is requested.

4. The assimilation method according to claim 3, wherein said undoing step further comprises:

a step of memorizing the number of undoing requests for a corrected item of at least one of the assimilation candidate and the assimilation condition, as the undoing number also included in said assimilation knowledge data for the automatic correction.

5. The assimilation method according to claim 4, wherein the undoing step further comprises a step of automatically deleting and/or degrading (descending on a list) a candidate having an item whose undoing number is more than a threshold value, where the candidate is an element of at least one of an assimilation candidate list and an alternative candidate list of assimilation condition.

6. The assimilation method according to claim 2, wherein said step of performing said automatic correction further comprises a step of:

h. counting up, in the datablock representing the alternative candidate of assimilation condition, a number of the change request when the requested item is requested before; and i. a step of accepting and performing an automatic correction of an assimilation condition by the processor using said assimilation knowledge data when said number is more than a threshold value stored in advance as said assimilation knowledge data.

7. The assimilation method according to claim 1, wherein said problem is a prediction problem.

8. The assimilation method according to claim 7, wherein said evaluating step comprises:

a step of prediction and also comprises a step of displaying a prediction error which is shown as a deviation of previously predicted data from actual tracking data obtained by tracking actual running of a moving object being at least one of a train, a bus, an airplane, a car and a ship.

9. The assimilation method according to claim 8, wherein the predicted data and the actual tracking data are displayed in the displaying step.

10. The assimilation method according to claim 8, where the prediction problem relates to a problem to predict t train positions at each time after the current time, and said actual tracking data corresponds to a collection of an actual "suji" representing a trajectory of train positions at each time, until the current time on a train schedule diagram.

11. The assimilation method according to claim 1, wherein said method further comprises the following steps, repeated until a satisfying assimilation proposal is obtained:

f. changing assimilation conditions to create an alternative plan of assimilation conditions as a part of assimilation knowledge data, by said processor according to change requests entered through said input/output device;

g. creating an alternative assimilation candidate by said processor utilizing the assimilation knowledge data including the alternative plan of assimilation conditions;

h. evaluating said alternative assimilation candidate by said processor, and i. determining a satisfying assimilation proposal through interaction between said processor, displaying said alternative assimilation candidate together with the result of the evaluation, and input data for the acceptance/change of said candidate from the input/output device.

12. The assimilation method according to claim 11, wherein said step of changing the assimilation condition further comprises:

i. a step of creating, before changing the assimilation condition, an alternative plan of the assimilation condition by said processor utilizing both the evaluation result of a previous assimilation candidate and the assimilation knowledge data, and displaying the alternative plan as a guidance for changing an assimilation condition; and k. a step of interactively changing the assimilation condition by referring to the guidance, in order for said processor to create an assimilation candidate to be more satisfied by using the new assimilation condition than the previous assimilation candidate created by using the previous assimilation condition.

13. The assimilation method according to claim 12, wherein displaying part of the creating and displaying step in a step of automatically displaying, at a time, said alternative plan of the assimilation condition together with the assimilation candidate created by said processor utilizing both the alternative plan of assimilation condition and the assimilation knowledge data.

14. The assimilation method according to claim 11, wherein the step of changing the assimilation condition is automatically performed by said processor utilizing the evaluation result of the assimilation candidate in addition to said assimilation knowledge data.

15. The assimilation method according to claim 11, wherein the evaluating step includes a step of displaying the assimilation proposal, together with the alternative plan of the assimilation condition and the evaluation result, at a time, on a multi-window screen.

16. The assimilation method according to claim 11, wherein a mouse is used as said input/output device for inputting said assimilation condition.

17. The assimilation method according to claim 1, wherein the object problem includes at least one of a replanning problems in case of a traffic disorder, and a planning problems.

18. The assimilation method according to claim 17, wherein said planning problems include at least one of a train traffic control plan generation problem, and a man allocation plan generation problem.

19. The assimilation method according to claim 1, wherein said method further comprises the following steps, repeated until a satisfying assimilation proposal is obtained:

f. changing the assimilation candidate by said processor according to change requests entered through said input/output device;

g. evaluating the changed assimilation candidate by said processor; and h. determining a satisfying assimilation proposal through interaction between said processor, displaying the changed assimilation candidate together with the result of the evaluation, and input data from the input/output device.

20. A knowledge data assimilation system for changing data representing knowledge (problem solving knowledge data) for solving a problem, comprising:

a processor;

a storage device for storing said problem solving knowledge data and data representing knowledge (assimilation knowledge data) for inferring assimilation candidates wherein said assimilation knowledge data can be taken as a kind of said problem solving knowledge data since said assimilation knowledge data is also able to be assimilated like said problem solving knowledge data; and an input/output device, including a displaying device:

means for creating an assimilation candidate to assimilate said problem solving knowledge data, either by said processor utilizing said assimilation knowledge data, or by inputting an assimilation proposal interactively through said input/output device;

means for evaluating the created assimilation candidate by said processor utilizing at least an evaluation standard stored in advance;

means for determining a satisfying assimilation proposal through interaction between said processor displaying a result of said evaluation and input data inputted either for accepting said assimilation candidate as a satisfying assimilation proposal, or for changing/modifying at least one of said assimilation candidate and assimilation knowledge data including assimilation conditions, from said input/output device; and means for changing said problem solving knowledge data by said processor according to said satisfying assimilation proposal when a satisfying assimilation proposal is determined (obtained).

* * * * *

UNITED STATES PATENT AND TRADEMARK OFFICE
CERTIFICATE OF CORRECTION

PATENT NO. : 5,526,516
DATED : June 11, 1996
INVENTOR(S) : Setsuo Tsuruta, et al.

It is certified that error appears in the above-indentified patent and that said Letters Patent is hereby corrected as shown below:

Claim 2, column 7, line 7, after "including the" insert --evaluation result, as a correction pattern included in--.

Claim 10, column 7, line 62, delete "t" and insert therefor --train positions at each time after the current time and predicted data corresponds to a collection of a predicted "suji" representing a trajectory of a predicted--.

Claim 12, column 8, line 23, delete "i." and insert therefor --j.--.

Claim 13, column 8, line 38, delete "in" and insert therefor --is--.

Signed and Sealed this

Twenty-fourth Day of September, 1996

Attest:

BRUCE LEHMAN

*Attesting Officer*  *Commissioner of Patents and Trademarks*